United States Patent Office 2,915,522
Patented Dec. 1, 1959

2,915,522

N-(BETA-METHYL-MERCAPTO-ETHYL) DERIVATIVES OF CERTAIN TROPANE ALKALOIDS

Otto Zima, Darmstadt-Eberstadt, and Georg Seitz, Darmstadt, Germany, assignors to E. Merck Aktiengesellschaft, Darmstadt, Germany, a corporation of Germany No Drawing. Application March 6, 1957
Serial No. 644,199

Claims priority, application Germany March 8, 1956

10 Claims. (Cl. 260—292)

This invention relates to nor-tropine and nor-pseudo-tropine. In particular, it is directed to novel derivatives thereof in which the nitrogen atom carries as a substituent the beta-methyl-mercapto-ethyl radical; and to the esters of such N-beta-methyl-mercapto-ethyl-nor- and nor-pseudo-tropines derived from fatty and aryl-fatty acids, the acid addition salts thereof, and method of manufacturing said novel compounds.

It is known that N-substituted derivatives of nor-tropinone can be prepared from acetone-dicarboxylic acid, succindialdehyde, and primary amines by a synthesis analogous to that of the Schopf modification of the Robinson synthesis, hereinafter referred to as the Robinson-Schof synthesis. See Journal of the American Chemical Society, vol. 68, p. 1608 (1946), and Receuil des Travaux Chimiques des Pays-Bas, vol. 73, p. 203 (1954).

The present invention arises from the novel and surprising discovery that the substitution of a hydrogen atom attached to the nitrogen atom in nor-tropine or nor-pseudo-tropine derivatives by a beta-methyl-mercapto-ethyl radical results in the formation of valuable products.

In accordance with the invention, acetone-dicarboxylic acid, succindialdehyde, and beta-methyl-mercapto-ethyl amine are condensed under the conditions of the Robinson-Schopf synthesis. The resulting tropinone derivative is then reacted with a reducing agent, as for example, hydrogen, in the presence, advantageously, of a solid sulfide catalyst, such as rhenium sulfide, or with a chemical reducing agent, advantageously, with an alkali metal-earth metal-hydride, such as lithium-aluminum-hydride. Then the obtained tropine or pseudo-tropine derivative is esterified with an organic acid, advantageously an aromatic or aryl fatty acid, which acids may, for example, also contain hydroxyl substituents. The esterification may be carried out by customary or usual procedures. The water solubility of these esters may, optionally, be enhanced by their conversion into acid addition salts, such as the hydrochloride, the sulfate, nitrate, ethyl sulfonate, etc.

It has been found that these esters of tropine and pseudo-tropine possess anesthetic activity. Clinical investigations have shown that the benzoic acid ester has particularly good local anesthetic activity. Other esters, such as the benzilic acid ester, possess, moreover, parasympatholitic properties. The investigations with these newly discovered compounds have shown that in contrast to the hitherto known usual tropine esters, they possess a much better therapeutic index. It has been found that the local anesthetic activity of the benzoic acid ester, as well as the parasympatholitic activity of an alpha-hydroxy fatty aromatic ester of tropine is considerably enhanced when the hydrogen atom attached to the nitrogen atom of the tropine is substituted by a beta-methyl-mercapto-ethyl radical.

The hydrochloride of the benzoic acid ester of N-(beta-methyl-mercapto-ethyl) nor-pseudo-tropine is tested, for example, on the rabbit cornea in accordance with the method of Eichholz-Slyzis to determine the local anesthetic activity. In comparison with the hydrochloride of the benzoic acid ester of pseudo-tropine, it produces a ten-fold greater local anesthetic effect with greater therapeutic extent. Tests with the ethane sulfonates as well as the chlorides of the benzilic acid ester of N-(beta-methyl-mercapto-ethyl)-nor-pseudo-tropine, in comparison with the hydrochloride of the benzilic acid ester of pseudo-tropine, show that it possesses a two-fold or three-fold stronger anti-histaminic effect.

The following are illustrative examples in accordance with the invention:

Example 1

To a solution of 70 grams of succindialdehyde in 1 liter of water there are added 161 grams of acetone dicarboxylic acid (3-oxo-pentanedioic acid) and 80 grams of methyl-mercapto-ethyl-amine, with cooling and adjustment of the pH of the solution to a value of pH 5–6. A vigorous evolution of carbon dioxide occurs whereby the temperature rises to ca. 35° C., and the pH goes over to the alkaline side. By the suitable addition of some acetic acid the pH of the solution is maintained at pH 6. After standing for 40 hours at room temperature, and by the addition of animal charcoal, the reaction mixture is filtered; rendered strongly alkaline by the addition of caustic soda solution, and then shaken with chloroform. From the chloroform extract there is obtained, on vacuum evaporation of the chloroform, 173 grams of the product. The product is dissolved in absolute alcohol. Upon addition thereto of ether saturated with hydrogen chloride, and while cooling with ice, there is obtained the hydrochloride of the product. This hydrochloride may be recrystallized from isopropanol. There is thus obtained the N-(beta-methyl-mercapto-ethyl)-nor-tropinone in a yield of 85 grams; the salt has a melting point of 189°–191° C.

Instead of precipitating the desired reaction product in the form of the hydrochloride, the evaporation residue from the chloroform extraction may be directly distilled under vacuum. In this way the N-(beta-methyl-mercapto-ethyl)-nor-tropinone is obtained as an oily base. It boils at 175° C. under 8 mm. of pressure (mercury scale); and upon neutralization with HCl is converted into the above described hydrochloride.

The picrate of the N-(beta-methyl-mercapto-ethyl)-nor-tropinone melts at 142°–144° C.

Example 2

4.6 grams of lithium-aluminum-hydride are dissolved in 300 cc. of absolute ether. During the course of 25 minutes there are added dropwise to this solution, a solution of 73 grams of the free base (described in Example 1), dissolved in 125 cc. of absolute ether, with stirring. The mass is then boiled for five minutes, under reflux, and then decomposed by the addition of, first, 250 cc. of water, and then 320 cc. of a 20% aqueous solution of sodium hydroxide. The upper layer (the ethereal solution) is separated, the aqueous layer is shaken with ether, and the combined ethereal extracts then distilled. The residual raw base is then taken up in hot cyclohexane from which it is slowly displaced by petroleum ether. After standing for a considerable time in the cold, there may be removed by suction filtration 37.2 grams of the pure N-(beta-methyl-mercapto-ethyl)-nor-pseudo-tropine, having a melting point of 67° C. The base forms well crystallized salts as, for example, the hydrochloride, having a melting point of 256–257° and a picrate having a melting point of 134–135° C.

The mother liquor contains a further quantity of the N-(beta-methyl-mercapto-ethyl)-nor-pseudo-tropine, as well as the N-(beta-methyl-mercapto-ethyl)-nor-tropine of the normal series. The isolation and separation thereof can be effectuated by the different solubilities of their hydrochlorides in alcohol. On the distillation of the cyclohexane-petroleum ether mixture, the distillation residue is taken up in isopropanol, neutralized with ethereal hydrogen chloride, and then precipitated with ether. Upon recrystallization of the precipitate from absolute alcohol and isopropanol there is obtained a further 14.2 grams of the N-(beta-methyl-mercapto-ethyl)-nor-pseudo-tropine hydrochloride, and from the mother liquor the much more readily soluble component, 12.7 grams of N-(beta-methyl-mercapto-ethyl)-nor-tropine hydrochloride having a melting point of 160° C.

The pictrate of the N-(beta-methyl-mercapto-ethyl)-nor-tropine melts at 142° C.

*Example 3*

11.7 grams of the N-(beta-methyl-mercapto-ethyl)-nor-tropinone-hydrochloride in 60 cc. water with 1 gram of rhenium heptasulfide, and hydrogen are shaken up under a pressure of 100 atmospheres and at a temperature of 180° C. At the end of five hours the catalyst is removed by suction filtration, the filtrate is distilled under vacuum to dryness, and the residue recrystallized from alcohol-ether. There is thus obtained the N-(beta-methyl-mercapto-ethyl)-nor-pseudo-tropine hydrochloride having the melting point of 256–257° C. as described in Example 2. This salt can be converted into the picrate having a melting point of 136° C.

*Example 4*

12.7 grams of N-(beta-methyl-mercapto-ethyl)-nor-pseudo-tropine were triturated with 14.3 grams of benzoyl chloride, and heated on an oil bath for four hours at 170° C., whereby the evolution of hydrogen chloride ceased. Upon cooling, the reaction mixture was covered into water; rendered alkaline with soda; and then extracted with ether. To isolate the benzoic acid ester, the ethereal extract was washed with a dilute solution of soda, and the base shaken out with a 5% solution of hydrochloric acid. The acid extract was again rendered alkaline so that the base could again be taken up in ether. The ethereal solution was dried.

By the addition of ethereal hydrogen chloride the hydrochloride of the benzoic acid ester of N-(beta-methyl-mercapto-ethyl)-nor-pseudo-tropine was obtained. It was recrystallized from isopropanol. It was obtained in a yield of 13.3 grams. Its melting point was 248° C.

*Example 5*

2.6 grams of N-(beta-methyl-mercapto-ethyl)-nor-pseudo-tropine was intimately triturated with 2.8 grams of anisoyl chloride. The mixture was then heated for four hours at 170°–180° C. and then taken up in water on cooling. Upon alkalinization with ammonia, the reaction mixture was extracted with ether, and the ethereal solution was washed with a dilute solution of soda and water. The ethereal solution of the free base was shaken with dilute hydrochloride acid to extract the base. The free base was recovered from the acidulous extract in purified form by alkalinization. After being shaken with ether, the new base was neutralized with alcoholic hydrogen chloride; and the hydrochloride of the anisic acid ester of the N-(beta-methyl-mercapto-ethyl)-nor-pseudo-tropine was precipitated. Upon recrystallization from alcohol-ether it was obtained in the pure state. The yield was 2.2 grams. It had a melting point of 245° C.

*Example 6*

10.4 grams of N-(beta-methyl-mercapto-ethyl)-nor-pseudo-tropine, 22.8 grams of the benzilic acid ethyl ester, and 0.15 gram of sodium were heated for 22 hours under vacuum, whereby the splitting off of the alcohol was practically completed. The cooled melt was shaken up with a 5% solution of hydrochloric acid, whereby the mother liquor yielded a difficultly soluble hydrochloride. This was removed by suction filtration, washed with ether and a small amount of water, which yielded on drying 17.5 grams of the raw hydrochloride. From the filtrate there is obtained, on shaking with alkali and chloroform, 1.6 grams of unconverted N-(beta-methyl-mercapto-ethyl)-nor-pseudo-tropine.

The 17.5 grams of the crude reaction product is dissolved in boiling methanol, whereby a small amount of an insoluble by-product is obtained on filtration. This insoluble by-product has a melting point of 218° C. The methanol solution is concentrated somewhat. The just purified by hydrochloride of the benzilic acid ester of the N-(beta-methyl-mercapto-ethyl)-nor-pseudo-tropine is crystallized by the addition of acetone and ether. The yield is 12.1 grams; the melting point 147° C.

The readily water soluble ethanesulfonate of the benzilic acid ester of N-(beta-methyl-mercapto-ethyl)-nor-pseudo-tropine melts at 195°–196° C.

*Example 7*

10 grams of the N-(beta-methyl-mercapto-ethyl)-nor-pseudo-tropine were fused with 30 grams of benzilic acid. At 100° C. there was introduced slowly, with stirring, a stream of dry hydrogen chloride. The melt was taken up in water, and the excess of the benzilic acid was removed by shaking with ether. The product was then rendered alkaline and shaken out with chloroform. Upon distillation, a residue was obtained constituting 17.4 grams of the oily base. The oily base was dissolved in alcohol, and to the alcoholic solution there was added ethereal hydrogen chloride, with cooling, whereby the base was converted into the hydrochloride. By means of hot acetone there was obtained therefrom, 3.9 grams of the benzilic acid ester of N-(beta-methyl-mercapto-ethyl)-nor-pseudo-tropine having a melting point of 147° C. This is identical with the product obtained as described in Example 6, whereas the unreacted starting material remains as an insoluble hydrochloride having a melting point of 251°. It can be suitably reworked.

*Example 8*

When, in accordance with the general description of Example 6 there is used the N-(beta-methyl-mercapto-ethyl)-nor-tropine instead of the pseudo compound, there is obtained the readily soluble hydrochloride of the benzilic acid ester of N-(beta-methyl-mercapto-ethyl)-nor-tropine. This solid upon recrystallization from alcohol-ether, has a melting point of 201° C.

*Example 9*

5.7 grams of N-(beta-methyl-mercapto-ethyl)-nor-tropine, 11.4 grams of 9-hydroxy-fluorene carboxylic acid-(9)-methyl ester, and 0.1 gram of sodium were heated for 22 hours under vacuum at a temperature of 120–130° C. The cooled melt was taken up in absolute ether and filtered. From the ethereal solution there is obtained the hydrochloride of the new base by precipitation with ethereal hydrogen chloride. Upon recrystallation from alcohol there is obtained the hydrochloride of the 9-hydroxy - fluorene - carboxylic acid - (9) - ester of N-(beta - methyl - mercapto - ethyl) - nor - tropine having a melting point of 185° C. in a yield of 6.0 grams.

*Example 10*

By conversion of an ester of N-(beta-methyl-mercapto-ethyl)-nor-pseudo-tropine with an acid the corresponding acid addition salt is obtained. In many cases the procedure is to neutralize the free base in a suitable solvent with the respective acid. After concentration the acid addition salt crystallizes and may be recrystallized from lower alcohols. The sparingly soluble acid addition salts may also be prepared by conversion of a readily soluble acid addition salt with the corresponding acid.

The above procedure was, for instance, used in the preparation of the following acid addition salts of the N-

(beta - methyl - mercapto - ethyl) - nor - pseudo - tropine:

The sulphat of the benzilic acid ester of N - (beta-methyl - mercapto - ethyl) - nor - pseudo - tropine, $C_{24}H_{29}O_3NS \cdot H_2SO_4$, having a melting point of 184° C.

The nitrate of the benzilic acid ester of N-(beta-methyl - mercapto - ethyl) - nor - pseudo - tropine, $C_{24}H_{29}O_3NS \cdot HNO_3$, having a melting point of 196° C.

The sulphat of the benzoic acid ester of N-(beta-methyl - mercapto - ethyl) - nor pseudo - tropine, $C_{17}H_{23}O_2NS \cdot H_2SO_4$ having a melting point of 191° C.

The nitrate of the benzoic acid ester of N-(beta-methyl - mercapto - ethyl) -nor - pseudo - tropine, $C_{17}H_{23}O_2NS \cdot HNO_3$ having a melting point of 199° C.

It will be evident that the novel compounds of this invention have the general formula:

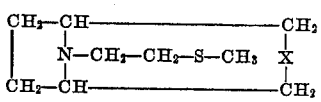

wherein X stands for a member of the group consisting of CO, CHOH, CHOR and CHOR.HAc, wherein R designates the acyl residue of a carboxylic acid selected from the group consisting of aromatic carboxylic acids and alpha-hydroxy aromatic fatty acids, and HAc designates an acid addition moiety.

It will be understood that the foregoing description of the invention and the examples set forth are merely illustrative of the principles thereof. Accordingly, the appended claims are to be construed as defining the invention within the full spirit and scope thereof.

We claim:

1. Compounds of the group consisting of bases having the formula

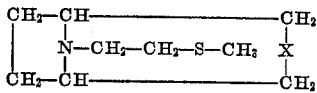

wherein X stands for a member of the group consisting of CO, CHOH and CHOR, wherein R designates the acyl residue of a carboxylic acid selected from the group consisting of benzoic acid and 9-hydroxy-fluorene-carboxylic acid, and the pharmaceutically acceptable acid addition salts thereof.

2. The benzoic acid ester of N-(beta-methyl-mercapto-ethyl)-nor-pseudo-tropine, having the formula

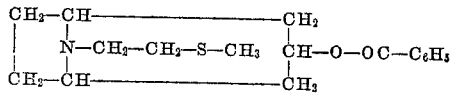

3. The hydrochloride of the benzoic acid ester of N-(beta - methyl - mercaptoethyl) - nor - pseudo - tropine of the formula

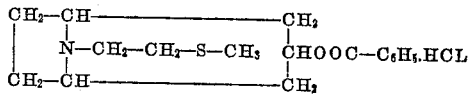

4. The hydrochloride of the 9-hydroxy-fluorene-carboxylic acid - (9) - ester of N - (beta - methyl - mercaptoethyl) - nor - tropine of the formula

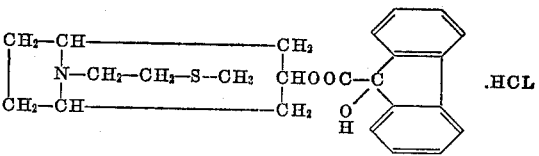

having a melting point of 185° C.

5. Ester of 9 - hydroxy - fluorene - carboxylic acid-(9) with N-(beta-methyl-mercapto-ethyl)-nor-pseudo tropine.

6. Pharmaceutically acceptable salts of the compound in accordance with claim 2.

7. The benzoic acid ester of N-(beta-methyl-mercapto-ethyl)-nor-tropine.

8. Ester of 9 - hydroxy - fluorene - carboxylic acid-(9) with N-beta-methyl-mercapto-ethyl)-nor-tropine.

9. Pharmaceutically acceptable salts of the compound in accordance with claim 8.

10. Pharmaceutically acceptable salts of the compound in accordance with claim 5.

No references cited.